United States Patent [19]
Schmidt et al.

[11] Patent Number: 5,274,701
[45] Date of Patent: Dec. 28, 1993

[54] TELEPHONE ALERTER

[75] Inventors: James N. Schmidt; Raymond C. Freeman; Rodney Pederson, all of London, Canada

[73] Assignee: Northern Telecom Limited, Montreal, Canada

[21] Appl. No.: 706,692

[22] Filed: May 29, 1991

[51] Int. Cl.⁵ .................................. H04M 1/04
[52] U.S. Cl. ............................. 379/375; 381/205; 381/188; 379/429
[58] Field of Search ............ 379/429, 372, 373, 375; 381/69, 87, 88, 188, 205; 248/222.1, 222.3

[56] References Cited

U.S. PATENT DOCUMENTS

| | | | |
|---|---|---|---|
| 3,180,606 | 12/1962 | Sabin et al. | 248/222.3 |
| 4,284,857 | 8/1981 | Slavin et al. | 381/205 |
| 4,507,800 | 3/1985 | Kelly | 381/88 |
| 4,574,272 | 3/1986 | Brown | 379/375 |
| 4,691,363 | 9/1987 | Khanna | 381/188 |
| 4,733,748 | 3/1988 | Ponticelli, Jr. | 381/205 |

Primary Examiner—James L. Dwyer
Assistant Examiner—M. Shehata

[57] ABSTRACT

In a telephone alerter a transducer disc is held onto a printed circuit board by an annular housing which is detachable from the board. The housing has spaced feet which are received through apertures in the board and the housing is then rotated to engage the feet with one side of the board and hold the housing in position. The transducer disc is easily removed by rotating the housing in the opposite direction to withdraw it from the printed circuit board. Preferably, the disc is retained within the housing by an O-ring retainer which is compressed between the printed circuit board and the disc. Upon removal of the housing, the disc and retainer may then be immediately withdrawn from the housing.

3 Claims, 2 Drawing Sheets

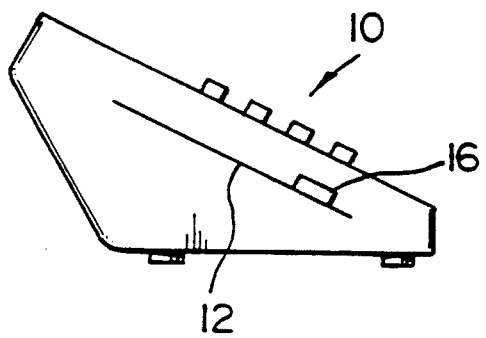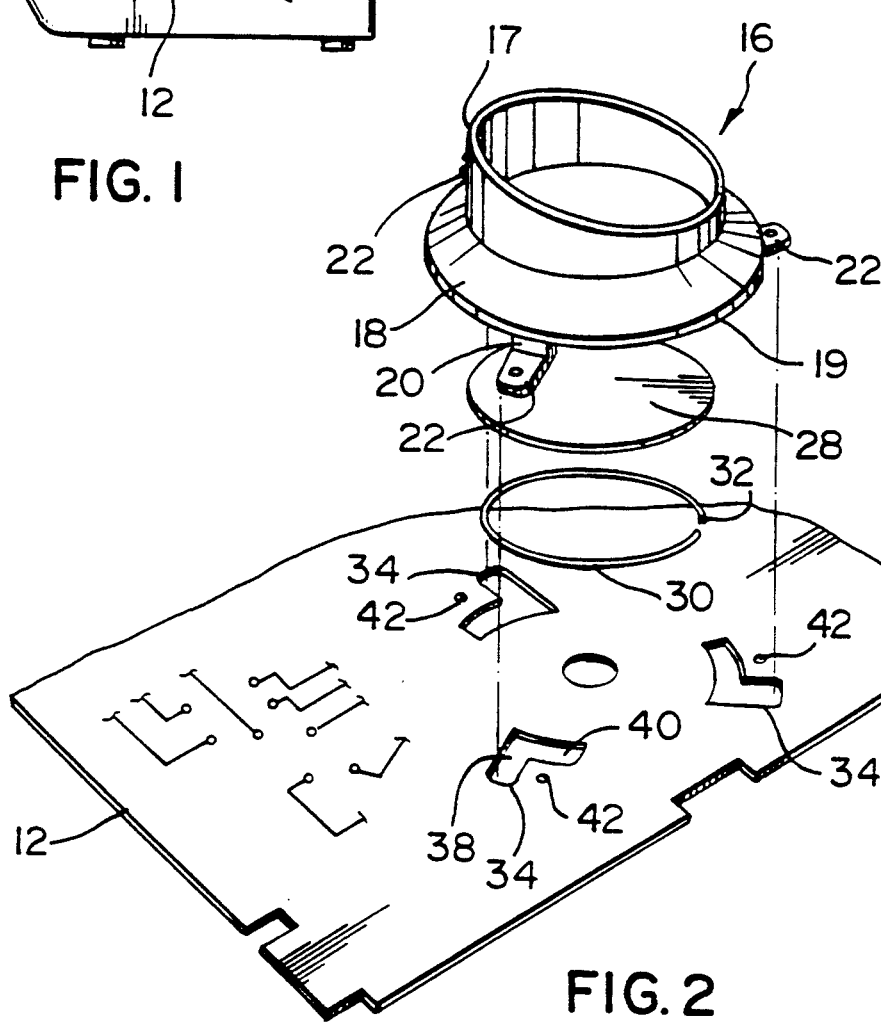

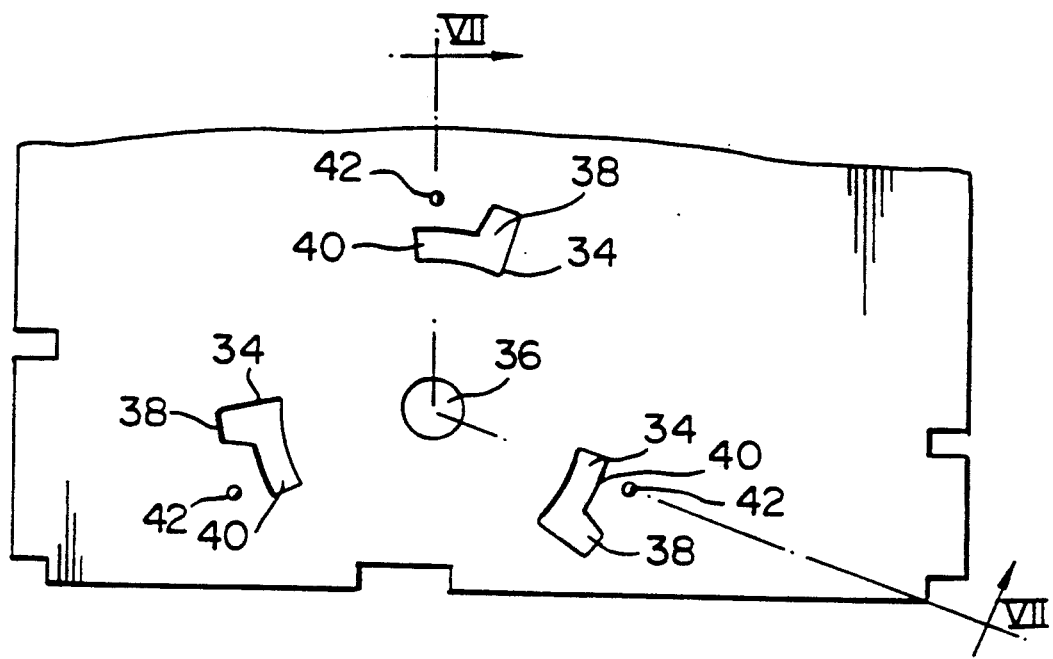
FIG. 3
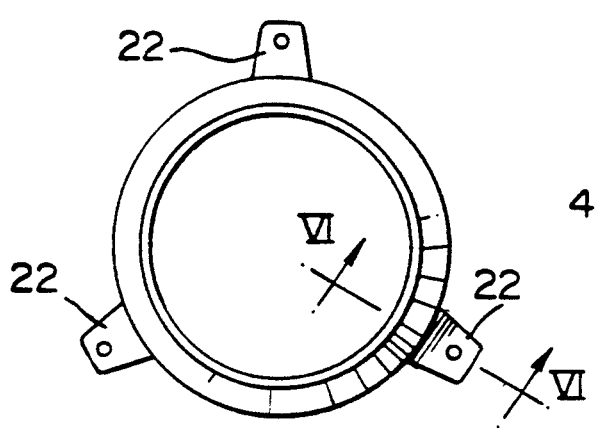
FIG. 4
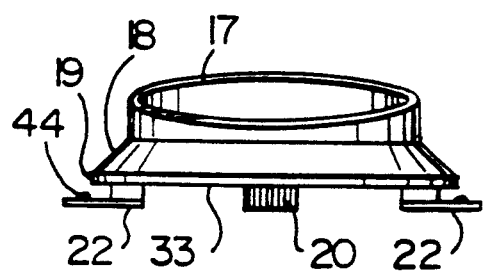
FIG. 5
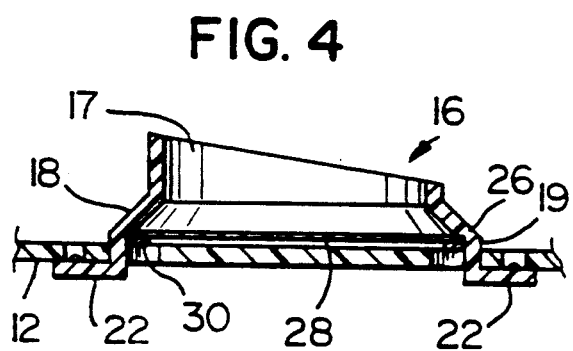
FIG. 7
FIG. 6

TELEPHONE ALERTER

This invention relates to telephone alerters.

In telephone constructions, audible alerters include an integrated circuit and a transducer disc to emit sound. The disc, in one conventional construction, is mounted in a housing which is mounted by heat staking pins, onto a printed circuit board. In an alternative conventional construction, the disc is permanently glued into a mounting which is integrally molded with the housing of the base of a telephone.

Problems arise with either of the above arrangements when a transducer disc requires to be replaced because it is damaged or does not meet desired specifications. In the majority of cases where alerters have to be replaced, the removal of the staking pins or the glue results in physical damage to the printed circuit boards or alerters so that they are completely unserviceable and all parts need to be discarded.

The present invention seeks to provide an alerter and support combination which alleviates the above problem.

According to the present invention there is provided a transducer disc for a telephone alerter and support combination comprising:- a transducer disc, and a transducer housing for holding the disc, the disc housing comprising a body and a plurality of spaced apart feet extending from the body; and a support formed with a plurality of apertures each for receiving an individual foot of the housing with the body of the housing mounted upon one side of the support, the disc housing being movable across said one side of the support after reception of the feet through the apertures to cause the feet to engage the other side of the support and hold the support against the body in an operational position of the disc housing upon the support.

With the above combination, for removal of the disc housing from the support, the housing is movable out of its operational position and across the support to realign the feet with the apertures. The feet may then be passed through the apertures to enable the housing to be dismantled from the support. Hence, with combinations according to the invention, transducer discs may be removed from their supports for replacement or repair without damaging or further damaging the discs and the supports.

In a preferred arrangement at least one of the feet is provided with a protuberance which in the operational position registers with a protuberance receiving space defined by the support. In this preferred arrangement, the protuberance and its receiving space provide a positive location for the disc housing when in its operational position.

It is also to be preferred that the disc housing comprises a seating surface for seating the transducer disc and a resilient disc retaining means is provided. The disc retaining means is locatable around edge regions of the disc for holding the disc assembled against the seating surface. With this preferred construction, it is unnecessary for the disc to be held as by soldering or adhesive to the housing so that the disc and housing may be completely disassembled without damage to the separate parts.

The invention also includes the assembly of a transducer disc for a telephone alerter and a support comprising a transducer disc and a transducer disc housing holding the disc, the disc housing comprising a body and a plurality of spaced apart feet extending from the body; and a support, the disc housing assembled to the support with its body on one side of the support by reception of the feet through apertures formed in the support and then by relative movement of the disc housing and support to move the feet away from the apertures whereby the feet engage the other side of the support and hold the support against the body with the disc housing in an operational position.

In the above assembly according to the invention, it is preferable that the disc housing comprises a seating surface against which the transducer disc is seated and a resilient disc retaining means is resiliently compressed between the one side of the support and an edge region of the transducer disc at one side of the disc to hold the disc against the seating surface. With this preferred arrangement, not only is the disc easily removable from within the housing, but also the resilient disc retaining means serves to ensure that the disc is held in position in the assembly. Upon removal of the disc housing from the support, the resilient disc retaining means is no longer held in position by the support so that the disc and retaining means are immediately removable from the housing. In addition to this, with the resilient disc retaining means being resiliently compressed against the one side of the support, then the retaining means applies a force against the one side of the support to create a frictional grip upon the support and normally retains the disc housing in its operational position.

One embodiment of the invention will now be described by way of example with reference to the accompanying drawings, in which:

FIG. 1 is a diagrammatic side elevational view of the base of a telephone and showing the position of a transducer disc, disc housing, and support assembly within the base, the assembly being according to the embodiment;

FIG. 2 is an isometric exploded view of the parts of the assembly of FIG. 1;

FIG. 3 is a plan view of part of the support;

FIG. 4 is a plan view of the disc housing;

FIG. 5 is a side elevational view of the housing taken in the direction of arrow V in FIG. 4;

FIG. 6 is a cross-sectional view through part of the housing taken along line VI—VI in FIG. 4 and to a larger scale; and FIG. 7 is a cross-sectional view of the assembly taken along line VII—VII as shown through the support in FIG. 3.

In the embodiment as shown in FIG. 1, a telephone base 10 incorporates within it a printed circuit board 12 comprising circuitry for operation of the telephone. The printed circuit board forms part of an assembly of a transducer disc of a telephone alerter, a disc housing, and support wherein the support is provided by the printed circuit board. The disc housing 16 shown in FIG. 1 is carried at a lower end of the printed circuit board 12.

As shown by FIGS. 2 and 4, the housing 16 has a cylindrical body 17 with an inclined upper end and a flared lower end region 18 terminating in a short axially extending flange 19. From the flange 19 depend three legs 20 in equally spaced angular positions, each of the legs terminating at its lower end in a radially outwardly extending foot 22. As shown particularly by FIG. 7, on the inside of the housing 16 at the junction of the lower end region 18 and the flange 19 is provided a downwardly facing (i.e. axially of the housing) surface 26 which forms a seating surface for a transducer disc 28 which is of sufficient diameter to be supported on one side at edge regions of the disc by the seating surface 26. Also, in the assembly there is provided a resilient disc retaining means in the form of a rubber or synthetic elastomer O-ring 30 which may be continuous or be formed with a slit 32 as shown in FIG. 2 so as to be discontinuous. This O-ring is of such a diameter as to fit snugly within the flange 19 while engaging the edge regions of the disc on its side remote from the seating surface 26 with the O-ring projecting slightly beyond a lower edge 33 of the housing before the housing and disc are assembled upon the printed circuit board 12.

As shown in FIG. 2 and particularly in FIG. 3, the printed circuit board 12 is provided with three apertures 34 which lie upon and are spaced apart around a common pitch circle centered upon a position 36 of the board. The apertures are generally of L-shaped configuration and have outwardly extending aperture portions 38 relatively positioned to enable the feet 22 to be passed through the apertures, one foot to each aperture, and aperture portions 40 which extend a short distance around a pitch circle band common to radially inner regions of the aperture portions 38. These aperture portions 40 are for accommodating the legs 20 of the housing during assembly of the housing to the printed circuit board. The printed circuit board is also provided with three holes 42 disposed slightly radially outwards from the center 36 from the aperture portions 40 and each of these holes 42 forms a protuberance receiving space for receiving a protuberance 44 extending upwardly from each of the feet 22 as shown in FIG. 6.

To form the assembly, the disc 28 is first positioned upon the seat 26 as shown in FIG. 7 and the rubber O-ring 30 is disposed on the other side of the disc and within flange 19. This assembly is practically performed with the parts inverted from FIG. 7. With the disc, housing and O-ring so positioned together, the housing 16 is then offered to the printed circuit board and the feet 22 are passed one through each of the aperture portions 38 to locate the feet 22 on the other side of the plane of the printed circuit board from that occupied by the housing generally. The housing 16 and printed circuit board 12 are then relatively rotated about the center 36 so that the legs 20 pass along the aperture portions 40 and the feet move in contact with the side of the printed circuit board opposite to the side engaged by the housing 16 generally (i.e. engaged by the lower end of the flange 19. As the rotation proceeds, the protuberances 44 approach and then finally engage into ends of the holes 42 in the printed circuit board at which point the housing 16 and the disc 28 are in operational positions.

The housing 16 is itself formed of resilient plastics material and the feet 22 are somewhat resilient so that there is frictional engagement between the feet and the one side of the printed circuit board 12 to resist unintentional removal of the housing from the board. In addition, the rubber O-ring 30 becomes compressed between the printed circuit board 12 and the transducer disc 28 during assembly so as to hold the disc seated against the seating surface 26. While the rubber O-ring serves the purpose of retaining the disc in position therefore, it also serves the additional purpose of increasing the frictional grip of the housing 16 upon the printed circuit board 12 because the compression of the rubber serves to apply a load against the surface of the board. Hence, there is a slight resistance to turning of the housing 16 both into and out of its operational position as offered by the rubber O-ring 30. Thus the O-ring 30 serves a dual purpose in not only holding the disc 28 in position but also in providing a resistance to unintentional removal of the housing 16.

In use, the assembly is as shown in FIG. 7. Should the transducer disc 28 become damaged in any way or fail to meet design specifications, then it is easily removed by rotation of the housing 16 into a position in which the feet 22 become realigned with the aperture portions 38 at which time the feet may be drawn back through the apertures and the alerter becomes completely dismantled from the printed circuit board. An added advantage with the above construction is that upon removal from the printed circuit board, the rubber O-ring 30 is no longer trapped between the board and the disc 28 and it becomes completely free so as to enable it to be removed easily followed by easy removal of the disc 28. Thus, upon removal of the housing 16, the loose assembly of housing, disc and O-ring 30 is quickly dismantled for replacement of defective parts while making it possible to retain any parts of the assembly which are still acceptably functional.

In addition, during assembly of the housing 16 onto the printed circuit board 12, no method step is required to secure the disc 28 permanently to the board. Further, difficult dismantling procedures are also avoided by the method of assembly.

In making of the assembly of alerter to the printed circuit board, any assembly process steps for permanently securing, e.g. by heat staking or gluing, the disc 28 to the board are avoided thereby allowing for cost minimization. Also difficulties in dismantling the disc from a permanent fixture upon the board are avoided together with resultant breaking and scrapping of parts of the assembly.

What is claimed is:

1. A telephone alerter comprising:
   a transducer disc and a housing for holding the disc, the housing comprising an annular body and a plurality of feet extending from one end of the body and spaced apart around the body, the body having a seating surface for seating the disc, the seating surface facing axially from said one end of the body;
   a resilient disc retaining means for location around edge regions of the disc; and
   a planar support having two sides and formed with a plurality of apertures each for receiving an individual foot of the disc housing with the body of the housing mounted upon one of the sides of the support;
   and when the disc is seated against the seating surface and the retaining means located between the disc and the support, the disc housing is rotatably movable on said one side of the support after reception of the feet through the apertures to cause the feet to engage the other of the sides of the support to locate the support against the body in an operational position of the disc housing upon the support and resiliently compress the retaining means between the disc and the support, the resiliently compressed retaining means holding the disc against the seating surface and resisting movement of the housing out of its operational position.

2. A telephone alerter according to claim 1 wherein at least one of the feet is provided with a protuberance which, in the operational position of the disc housing on the support, registers within a protuberance receiving space defined by the support.

3. A telephone alerter comprising:

a transducer disc and a housing for holding the disc, the housing comprising an annular body and a plurality of feet extending from one end of the body and spaced apart around the body, the body having a seating surface for seating the disc, the seating surface facing axially from said one end of the body;

a resilient disc retaining means for location around edge regions of the disc; and a planar printed circuit board having two sides and formed with a plurality of apertures each for receiving an individual one of the feet of the annular body with the annular body mounted upon one side of the printed circuit board;

and when the disc is seated against the seating surface, the retaining means is located between the disc and one of the sides of printed circuit board and the feet are received through their respective apertures, the disc housing is rotatably movable on the printed circuit board to cause the feet to engage the other of the sides of the printed circuit board and locate the disc housing against the printed circuit board in an operational position of the disc housing and resiliently compress the retaining means, the resiliently compressed retaining means holding the disc against the seating surface and resisting movement of the disc housing out of its operational position.

* * * * *